April 7, 1964

N. E. HAMILTON 3,127,646

ALLOYING FIXTURES

Filed Oct. 6, 1959

*INVENTOR.*
NOBLE E. HAMILTON

*BY* [signature]

ATTORNEY

United States Patent Office 3,127,646

Patented Apr. 7, 1964

3,127,646
ALLOYING FIXTURES

Noble E. Hamilton, Belmont, Mass., assignor to Clevite Corporation, Cleveland, Ohio, a corporation of Ohio Filed Oct. 6, 1959, Ser. No. 844,765
1 Claim. (Cl. 22—116)

Figure 1:
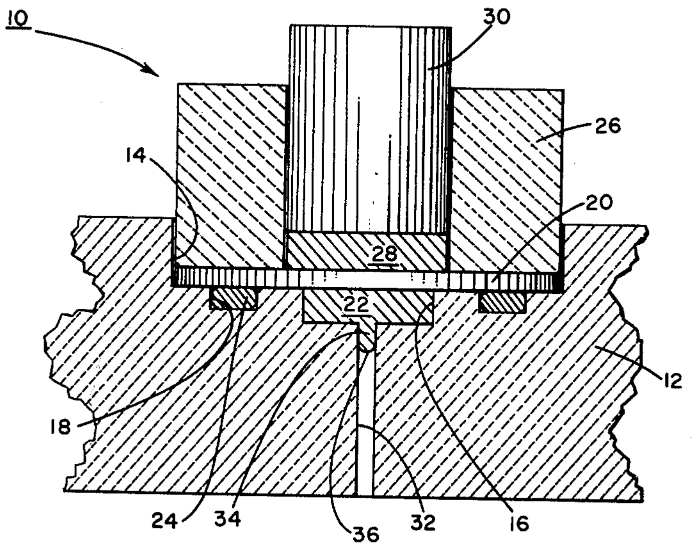

This invention relates to alloying fixtures for semiconductor devices and particularly devices, such as transistors, which have alloyed P-N junctions and/or ohmic base contacts formed on opposite sides of a semiconductor wafer.

As used herein, "contacts" is intended to embrace rectifying junctions as well as ohmic contacts.

One of the most widely used methods of fabricating semiconductor devices at the present time involves the alloying of alloy metal pellets or "preforms" to a wafer of semiconductor material of the desired conductivity type. Alloying is customarily accomplished by disposing the wafer of semiconductor material and the alloying pellets in proper relative positions in an alloying boat, suitably weighting down the assembly to insure intimate physical contact between the pellets and the respective surfaces of the wafer, and placing the loaded boat in an alloying furnace. Conveniently, the non-rectifying electrode or base contact may be applied at the same time.

In the formation of P-N junctions by alloying it is important that the alloying metal wet the surface of the semiconductor wafer; poor wetting during alloying gives semiconductor devices with poor electrical properties. In the alloying method as generally practiced heretofore, it is usually noticeable that better wetting occurs on the upper surface of the wafer than on the lower side, the designation "upper and "lower" having reference to the wafer position while in the alloying furnace. The difference in wetting is generally attributed to the dissimilarity in contact pressure existing between the upper alloying pellet and the top surface of the wafer as compared with that between the alloying pellets beneath, and contacting the lower surface of, the wafer. This pressure difference stems from the fact that the alloy preforms disposed under the wafer are placed in locating recesses in the bottom surface of the boat; due to necessary commercial tolerances on the dimensions of the recesses and the volume of the alloy preforms, there is lack of uniformity in the resultant pressures.

Attempts have been made to solve this problem in the past with varying degrees of success. One solution resorted to is known as "double alloying," i.e., performing the alloying in two steps, inverting the wafer between furnace passes, so that the wafer surface being alloyed is uppermost each time. Another proposed solution is the use of elaborate spring and plunger arrangements for maintaining uniform pressures with respect to both the bottom and top surfaces of the wafer. Both of these approaches to the problem produce satisfactory results but both are unduly expensive in terms of increased labor and/or complexity of apparatus.

It is the fundamental object of the present invention to provide novel alloying fixtures which overcome at least one of the problems of the prior art as outlined above.

A more specific object is the provision of improved alloying fixtures which enable alloying of rectifying and/or ohmic contacts onto both surfaces of a semiconductor wafer simultaneously and with uniform or controlled alloying pressure.

Another object is the provision of alloying fixtures as characterized in the preceding object which are relatively simple in construction, foolproof in operation, and not materially more costly than comparable conventional apparatus.

These and other objects are accomplished by alloying fixtures in accordance with the present invention which comprise an alloying boat adapted to receive a wafer of semiconductor material and having, in its bottom surface, indentations adapted to contain alloying material. The fixture includes means defining an open-ended passage of relatively small cross-sectional area having one end in flow communication with the indentations.

Figure 2:
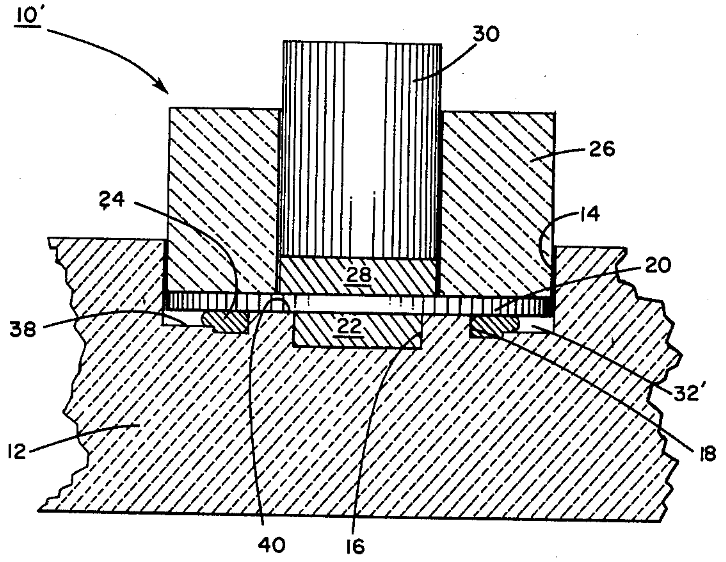

Further objects of the invention, its advantages, scope, and the manner in which it may be practiced will be readily apparent to persons conversant with the art from the following description and subjoined claim taken in conjunction with the annexed drawing in which like reference characters denote like parts throughout the several views and in which, FIGURE 1 is a vertical sectional view, partly in elevation, illustrating one form of apparatus in accordance with the invention; and FIGURE 2 is a view similar to FIGURE 1 illustrating a modified embodiment of the invention.

In FIGURE 1 there is illustrated a semiconductor alloying fixture 10 which, in its general aspects, is more or less conventional in design. The basic component of fixture 10 is an alloying boat, fragmentarily illustrated at 12. Individual alloying boats may be used for each device but, in volume production, it is customary to employ relatively large boats capable of holding a number of alloy assemblies. Boat 12 may be made of any suitable material which is not wet by nor reactive with the elements disposed therein. For germanium devices, graphite boats are probably the most commonly used.

For each semiconductor device to be alloyed, boat 12 contains a shallow cavity or recess 14 the cross-sectional shape and dimensions of which conform to those of, and adapt it to receive, the semiconductor wafer to be alloyed. For purposes of example, the alloying fixture being described is specifically adapted for the fabrication of a transistor comprising a circular wafer and having a concentric circular emitter surrounded by a concentric annular base ring, both being formed on the under surface of the wafer. Accordingly, cavity 14 is cylindrical in cross-section and its bottom surface formed with suitable indentations adapted to receive the emitter and base ring preforms. Specifically, the bottom of recess 14 contains a first, centrally-located, circular indentation 16 which, in use, contains the alloy material for forming the emitter junction.

Concentrically, surrounding indentation 16 is a somewhat shallower annular indentation 18 which is adapted to receive the preform of solder or the like which forms the ohmic base ring contact. FIGURE 1 illustrates alloying fixture 10 with a semiconductor wafer 20 in position and indentations 16 and 18 loaded with emitter and base ring preforms 22 and 24, respectively. Wafer 20 is maintained in position and weighted down upon the bottom of the recess by means of a tubular member 26 known as a "plug," usually of the same material as boat 12, e.g., graphite. Plug 26 is adapted to be slidably received within recess 14 and to rest upon the outer peripheral portion of wafer 20 in the general vicinity overlying annular base ring indentation 18. The interior of plug 26 conforms in shape, location and dimension to the collector junction to be formed on the upper surface of wafer 20. Therefore, when a collector alloy pellet or preform 28 is placed within plug 26, it is automatically located and maintained in the correct position on the upper surface of wafer 20. A cylindrical weight 30, known as a "pin," freely slidable within plug 26, is disposed therein to apply alloying pressure to collector preform 28.

The structure thus far described is, more or less, conventional. In accordance with the present invention a passage is provided having one end in flow communication with at least one of the indentations at the bottom of recess 14. In the FIGURE 1 embodiment, the passage takes the form of a bore 32 extending upwardly through the bottom of boat 12 and opening in the bottom of indentation 16. If desired, a passage comparable to bore 32 may be provided for annular indentation 18.

As will be seen and more readily appreciated from the following description of the operation of the alloying fixture, the particular configuration and dimensions of the passage 32 are susceptible of a considerable range of variation to obtain the desired results.

The various components of the transistor, viz., semiconductor wafer 20, emitter preform 22, collector preform 28, and base ring preform 24 are assembled in the alloying fixture as illustrated in FIGURE 1. Specifically, the emitter preform is disposed in indentation 16, the base ring preform in annular indentation 18 and the wafer positioned in the bottom of recess 14. Thereafter plug 26 is inserted into the recess so as to rest upon the wafer and collector preform 28 inserted into the internal opening in the plug so as to rest upon the upper surface of the semiconductor wafer. Finally, pin 30 is inserted into the plug so as to rest upon the collector preform.

The fabrication tolerances for the emitter preform are selected so that the minimum dimensional limits yield a preform of slightly larger volume than that of the indentation 16.

With the alloying fixture loaded as described, it is inserted into the alloying furnace. The various preforms fuse and alloying takes place in the normal manner. However, due to the above-specified volume relation between emitter preform 22 and the emitter indentation 16 the molten alloy in the indentation is squeezed into passage 32 as shown at 34. A pressure exists in the molten emitter material caused by and proportional to the surface tension existing at the meniscus surface 36 of molten alloy 34 in passage 32. Control of the diameter of bore 32 determines the radius of the liquid surface under tension and thereby permits regulation of the pressure in the liquid alloy. The cross-sectional dimension, therefore, of passage 32 is adjusted to produce a pressure sufficient to insure proper wetting and alloying of the emitter junction.

Observance of the amount of alloy squeezed into bore 32 provides a continuous check on the adequacy of the tolerances being used on the alloy preform size as well as the size of the indentations. Adjustment may, in some cases, be necessary to allow for the effect of surface film which, if present, is a function of the atmosphere in the furnace and the alloy etching pretreatment used.

In addition to its primary function as described above, passage 32 in the form illustrated in FIGURE 1 conveniently serves also to permit insertion of an ejection pin for removing the completed unit.

A modified form of the invention is illustrated in fixture 10', FIGURE 2, wherein all previously described conventional components are the same as illustrated in FIGURE 1 and are therefore identified by corresponding reference numerals. In fixture 10', the passage which is a counterpart of bore 32, FIGURE 1, takes the form of an annular clearance 32' between the portion of the bottom of recess 14 circumscribing indentation 18 and the overlying peripheral edge of the wafer. Clearance 32' is formed by suitable dimensioning of the recess 14 in boat 12. Thus, the annular portion 38 of the bottom of recess 14 radially outward of annular indentation 18 is slightly deeper than the portion 40 which is radially inward of the annular indentation. The amount of this clearance is greatly exaggerated in the drawing for purposes of clarity.

The function of the FIGURE 2 embodiment is the same as and will be readily apparent from the description of the FIGURE 1 embodiment.

From the foregoing description it will be appreciated that many variations are possible as to the specific way in which the surface tension passage is provided. Thus, for example, annular passage 32', FIGURE 2, could extend radially inwardly from the indentation 18 instead of, or in addition to, outwardly. Alternatively, the annular portion 40 of the bottom of recess 14 intermediate indentations 16 and 18 could be deeper than the peripheral portion 38 so as to provide an annular passage in flow communication at respective ends with both indentations. Moreover, while it would not ordinarily be necessary the principle could be applied to the alloying on the upper surface of the wafer or in conjunction with fixtures of the type disclosed and claimed in copending application for U.S. Letters Patent Serial No. 844,766 filed October 6, 1959, now Patent No. 3,070,859, issued January 1, 1963.

While there have been described what at present are believed to be the preferred embodiments of this invention, it will be obvious to those skilled in the art that various changes and modifications may be made therein without departing from the invention, and it is aimed, therefore, to cover in the appended claim all such changes and modifications as fall within the true spirit and scope of the invention.

What is claimed and desired to be secured by U.S. Letters Patent is:

A fixture for alloying contacts on a semiconductor wafer, comprising: An alloying boat recessed to receive a wafer of semiconductor material and having in its bottom surface, an indentation adapted to contain alloying material; and means defining a passage of relatively small cross-sectional area having one end in flow communication with said indentation, wherein said passage takes the form of an annular clearance space radially adjacent to and in flow communication with said indentation.

References Cited in the file of this patent

UNITED STATES PATENTS

| | | |
|---|---|---|
| 2,059,767 | Bausch | Nov. 3, 1936 |
| 2,526,588 | Small | Oct. 17, 1950 |
| 2,757,324 | Pearson | July 31, 1956 |
| 2,862,470 | Williams | Dec. 2, 1958 |

FOREIGN PATENTS

| | | |
|---|---|---|
| 1,080,678 | France | June 2, 1954 |